(12) United States Patent
Wang et al.

(10) Patent No.: US 11,250,813 B2
(45) Date of Patent: Feb. 15, 2022

(54) AMBIENT LIGHT DETECTION METHOD AND TERMINAL

(71) Applicant: HUAWEI TECHNOLOGIES CO., LTD., Guangdong (CN)

(72) Inventors: Juyou Wang, Shenzhen (CN); Chenlong Li, Beijing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/043,201

(22) PCT Filed: Apr. 28, 2018

(86) PCT No.: PCT/CN2018/085107
§ 371 (c)(1),
(2) Date: Sep. 29, 2020

(87) PCT Pub. No.: WO2019/192044
PCT Pub. Date: Oct. 10, 2019

(65) Prior Publication Data
US 2021/0027746 A1 Jan. 28, 2021

(30) Foreign Application Priority Data

Apr. 4, 2018 (CN) .......................... 201810302048.6

(51) Int. Cl.
*G09G 5/10* (2006.01)
*G06F 3/041* (2006.01)
(Continued)

(52) U.S. Cl.
CPC ............... *G09G 5/10* (2013.01); *G06F 3/041* (2013.01); *H04M 1/0264* (2013.01);
(Continued)

(58) Field of Classification Search
CPC ............. G09G 5/10; G09G 2320/0626; G09G 2360/144; G09G 3/34; G09G 5/00;
(Continued)

(56) References Cited

U.S. PATENT DOCUMENTS 8,619,153 B2 12/2013 Matsushita et al.
9,570,002 B2 * 2/2017 Sakariya .............. G09G 3/3225
(Continued)

FOREIGN PATENT DOCUMENTS

CN 102693698 A 9/2012
CN 104113617 A 10/2014
(Continued)

*Primary Examiner* — Pegeman Karimi
(74) *Attorney, Agent, or Firm* — Womble Bond Dickinson (US) LLP

(57) ABSTRACT

This application relates to the field of communications technologies, and provides an ambient light detection method and a terminal, to help save top space of a mobile phone, help increase a screen-to-body ratio of the mobile phone, and help improve user experience. The method includes: obtaining, by the terminal, a first luminance value of each first pixel, where each first pixel corresponds to one first luminance value; obtaining, by the terminal, a second luminance value of each region based on first luminance values of all first pixels included in each region, where each region corresponds to one second luminance value; obtaining, by the terminal, a luminance value of current ambient light based on all the second luminance values; and adjusting, by the terminal, luminance of the display based on the luminance value of the ambient light.

20 Claims, 6 Drawing Sheets

(51) Int. Cl.
 *H04M 1/02* (2006.01)
 *H04N 5/225* (2006.01)
(52) U.S. Cl.
 CPC ........ *H04M 1/0266* (2013.01); *H04N 5/2257* (2013.01); *G09G 2320/0626* (2013.01); *G09G 2360/144* (2013.01); *H04M 2250/12* (2013.01)
(58) Field of Classification Search
 CPC ... G06F 3/041; H04M 1/0264; H04M 1/0266; H04M 2250/12; H04N 5/2257
 See application file for complete search history.

(56) References Cited

U.S. PATENT DOCUMENTS

| | | | |
|---|---|---|---|
| 2006/0012733 A1* | 1/2006 | Jin | G02F 1/133512 349/73 |
| 2006/0133687 A1* | 6/2006 | Ehrlich | G06T 5/009 382/254 |
| 2009/0147106 A1 | 6/2009 | Sakamoto et al. | |
| 2012/0098976 A1* | 4/2012 | Matsushita | H04N 17/002 348/187 |
| 2014/0057683 A1 | 2/2014 | Li | |
| 2014/0375696 A1* | 12/2014 | Chuang | G09G 3/3406 345/690 |
| 2015/0364107 A1 | 12/2015 | Sakariya et al. | |
| 2016/0037042 A1* | 2/2016 | Zhang | H04N 5/23216 348/370 |
| 2018/0324342 A1 | 11/2018 | Zhou et al. | |

FOREIGN PATENT DOCUMENTS

| | | |
|---|---|---|
| CN | 106488203 A | 3/2017 |
| CN | 107222664 A | 9/2017 |
| CN | 107566695 A | 1/2018 |
| CN | 107645606 A | 1/2018 |
| JP | 2001223792 A | 8/2001 |
| JP | 2009130395 A | 6/2009 |
| JP | 2010020072 A | 1/2010 |
| JP | 2014519045 A | 8/2014 |

* cited by examiner

AMBIENT LIGHT DETECTION METHOD AND TERMINAL

This application is a national stage of International Application No. PCT/CN2018/085107, filed on Apr. 28, 2018, which claims priority to Chinese Patent Application No. 201810302048.6, filed on Apr. 4, 2018. Both of the aforementioned applications are hereby incorporated by reference in their entireties.

TECHNICAL FIELD

This application relates to the field of electronic technologies, and in particular, to an ambient light detection method and a terminal.

BACKGROUND

When a user uses a mobile phone, there are naturally light sources such as natural light and lamp light around. The light sources form ambient light of the mobile phone, and the ambient light affects a display effect of a screen of the mobile phone.

Usually, an ambient light sensor is installed below a display of the mobile phone, the ambient light sensor completes detection of ambient light, and the mobile phone adjusts luminance of the display based on a detection result, to improve visual experience of the user. In this detection method, because the ambient light sensor needs to receive the ambient light through the display, a part that is of the display and that covers the ambient light sensor cannot be used to display an image. Therefore, the ambient light sensor is usually installed at the top of the mobile phone, and the part that is of the display and that covers the ambient light sensor is not used to display an image. Consequently, a screen-to-body ratio (a ratio of a screen area to an entire-phone area) of the mobile phone is affected, and user experience is affected.

SUMMARY

Embodiments of this application provide an ambient light detection method and a terminal, to save top space of a mobile phone, help increase a screen-to-body ratio of the mobile phone, and help improve user experience.

According to a first aspect, a method provided in this application is applied to a terminal including a camera and a display. The camera includes at least two regions, and each region includes at least one first pixel. The method specifically includes:

obtaining, by the terminal, a first luminance value of each first pixel, where each first pixel corresponds to one first luminance value; obtaining, by the terminal, a second luminance value of each region based on first luminance values of all first pixels included in each region, where each region corresponds to one second luminance value; obtaining, by the terminal, a luminance value of current ambient light based on all the second luminance values; and adjusting, by the terminal, luminance of the display based on the luminance value of the ambient light.

The first pixel is a pixel that is preset by the terminal to perform ambient light detection. When the terminal enables a function of automatically adjusting the display luminance of the display, the terminal activates the first pixel, so that the first pixel is in a working state. These first pixels are used to detect a luminance value of current light, and a detected first luminance value of each pixel is stored into a register (for example, each preset first pixel may correspond to one register).

It may be understood that, it can be learned from an optical characteristic of the camera that light reaching a lens has different distributions. In other words, attenuation of the light differs in different regions of the camera. Therefore, region division is performed to detect luminance of light collected by the camera, and compensation of a different degree is performed on a detected luminance value of each region. This helps improve accuracy of the detected luminance value.

It should be noted that the region division herein is not physically separating pixels in different regions, but grouping a plurality of pixels included in a plurality of sensors. A grouping principle is that some adjacent pixels are grouped into one group, and the pixels in the group are equivalent to being in one region. In addition, the region division herein is preset.

Therefore, an ambient light sensor may not need to be installed on a mobile phone, and a location of one component is saved for top space of the mobile phone. This helps increase a screen-to-body ratio of the mobile phone and improve user experience.

In an embodiment, the camera further includes at least one second pixel, and the method further includes:

receiving, by the terminal, an operation used to enable the camera; and activating, by the terminal, the at least one second pixel in response to the operation.

It should be noted that the terminal includes the first pixel and the second pixel. The second pixel is a pixel that is not specified for ambient light detection. The terminal uses all pixels, including the first pixel and the second pixel, in the camera, to implement a photographing function. Therefore, when the terminal enables the photographing function, the terminal controls all first pixels and all second pixels to be in an activated state to work.

It should be noted that, in the embodiments of this application, the photographing function of the camera and an ambient light detection function of the camera are two independent functions, and do not affect each other. After the terminal enables a function of automatically adjusting ambient light, when the terminal is powered on and is screen-on, ambient light detection may be always performed by using the camera, and is not affected by a case of whether the camera performs photographing. In an ambient light detection process, the camera can perform photographing. In addition, in a photographing process of the camera, the camera can also detect ambient light intensity. Registers corresponding to the photographing function and the ambient light detection function of the camera may be separately disposed, and inter-integrated circuit (Inter-Integrated Circuit, IIC) buses corresponding to the two functions may also be separately disposed, so that the two functions can be independently implemented.

In an embodiment, if the function of automatically adjusting the display luminance of the display is enabled, and the camera is not enabled, each first pixel is in the activated state, and each second pixel is in an inactivated state; or if the camera is enabled, each first pixel and each second pixel are in the activated state.

It should be noted that, when the terminal enables the function of automatically adjusting the display luminance of the display and does not enable the photographing function, the first pixel is in the activated state, and the second pixel is in the inactivated state. If the terminal enables the function of automatically adjusting the display luminance of the display, when the terminal enables the camera function, the terminal activates all second pixels (the first pixel has been activated when the function of automatically adjusting the display luminance of the display is enabled).

In an embodiment, the obtaining, by the terminal, a luminance value of current ambient light based on all the second luminance values includes: using, by the terminal, a maximum value in all the second luminance values as the luminance value of the current ambient light.

In an embodiment, all first pixels in a first region include K1 red light pixels, K2 green light pixels, and K3 blue light pixels, and the first region is any one of the at least two regions. In a process in which the terminal obtains the second luminance value of each region based on the first luminance values of all the first pixels included in each region, the terminal performs the following operations on each region: obtaining, by the terminal, a third luminance value of red light based on K1 first luminance values of the K1 red light pixels included in the first region, where the K1 red light pixels correspond to one third luminance value of the red light; obtaining, by the terminal, a third luminance value of green light based on first luminance values of the K2 green light pixels included in the first region, where the K2 green light pixels correspond to one third luminance value of the green light; obtaining, by the terminal, a third luminance value of blue light based on first luminance values of the K3 blue light pixels included in the first region, where the K3 blue light pixels correspond to one third luminance value of the blue light; and determining, by the terminal, a second luminance value of the first region based on the third luminance value of the red light, the third luminance value of the green light, and the third luminance value of the blue light.

Herein, K1, K2, and K3 may be the same or may be different.

In an embodiment, the obtaining, by the terminal, a third luminance value of red light based on K1 first luminance values of the K1 red light pixels included in the first region includes: determining, by the terminal, that an average value of the K1 first luminance values or a maximum value in the K1 first luminance values is the third luminance value of the red light; the obtaining, by the terminal, a third luminance value of green light based on K2 first luminance values of the K2 green light pixels included in the first region includes: determining, by the terminal, that an average value of the K2 first luminance values or a maximum value in the K2 first luminance values is the third luminance value of the green light; and the obtaining, by the terminal, a third luminance value of blue light based on K3 first luminance values of the K3 blue light pixels included in the first region includes: determining, by the terminal, that an average value of the K3 first luminance values or a maximum value in the K3 first luminance values is the third luminance value of the blue light.

In an embodiment, the determining, by the terminal, a second luminance value of the first region based on the third luminance value of the red light, the third luminance value of the green light, and the third luminance value of the blue light includes: obtaining, by the terminal, a weighted average value of the third luminance value of the red light, the third luminance value of the green light, and the third luminance value of the blue light; and using, by the terminal, the weighted average value as the second luminance value of the first region.

For example, a same luminance value brings different visual experience to a user at different color temperatures. Therefore, different weights may be added to the luminance values of the R light, the G light, and the B light based on the color temperatures, and then the luminance values of the R light, the G light, and the B light are added based on the weights to obtain the luminance value of the region. Finally, the luminance value of the current ambient light is obtained.

For example, because different light sources include different components of the R light, the G light, and the B light, different weights may be added to the luminance values of the R light, the G light, and the B light based on characteristics of the different light sources. Then, the luminance values of the R light, the G light, and the B light are added based on the weights to obtain the luminance value of the region. Finally, the luminance value of the current ambient light is obtained.

In an embodiment, the determining, by the terminal, a second luminance value of the first region based on the third luminance value of the red light, the third luminance value of the green light, and the third luminance value of the blue light includes: obtaining, by the terminal, a weighted average value of the third luminance value of the red light, the third luminance value of the green light, and the third luminance value of the blue light; and compensating, by the terminal, the weighted average value based on a location of the first region to obtain the second luminance value of the first region.

In an embodiment, in a process in which the terminal obtains the second luminance value of each region based on the first luminance values of all the first pixels included in each region, the terminal performs the following operation on each region:

using, by the terminal, a first average value as a second luminance value of a first region, where the first average value is an average value of first luminance values of all first pixels in the first region, and the first region is any one of the at least two regions.

In an embodiment, in a process in which the terminal obtains the second luminance value of each region based on the first luminance values of all the first pixels included in each region, the terminal performs the following operation on each region: compensating, by the terminal, a first average value based on a location of a first region to obtain a second luminance value of the first region, where the first average value is an average value of first luminance values of all first pixels in the first region, and the first region is any one of the at least two regions.

In an embodiment, if the first region is closer to a central location of the camera, less compensation is provided for the weighted average value or the first average value; or if the first region is farther away from the central location of the camera, more compensation is provided for the weighted average value or the first average value.

According to a second aspect, a terminal is provided, including a camera, a processor, and a display, where the camera includes at least two regions, and each region includes at least one first pixel; the camera is configured to obtain a first luminance value of each first pixel, where each first pixel corresponds to one first luminance value; the processor is configured to obtain a second luminance value of each region based on first luminance values of all first pixels included in each region, where each region corresponds to one second luminance value; the processor is further configured to obtain a luminance value of current ambient light based on all the second luminance values; and the processor is further configured to adjust luminance of the display based on the luminance value of the ambient light.

In an embodiment, the camera further includes at least one second pixel; the processor is further configured to receive an operation used to enable the camera; and the camera is further configured to activate the at least one second pixel in response to the operation.

In a possible design, before the terminal obtains the first luminance value of each first pixel, the camera is further configured to control each first pixel in the terminal to be in an activated state.

In an embodiment, before the terminal obtains the first luminance value of each first pixel, the processor is further configured to enable a function of automatically adjusting the display luminance of the display; and the camera is further configured to control, in response to the enabling, each first pixel in the terminal to be in an activated state.

In an embodiment, if the function of automatically adjusting the display luminance of the display is enabled, and the camera is not enabled, each first pixel is in the activated state, and each second pixel is in an inactivated state; or if the camera is enabled, each first pixel and each second pixel are in the activated state.

In an embodiment, when obtaining the luminance value of the current ambient light based on all the second luminance values, the processor is specifically configured to use a maximum value in all the second luminance values as the luminance value of the current ambient light.

In an embodiment, all first pixels in a first region include K1 red light pixels, K2 green light pixels, and K3 blue light pixels, and the first region is any one of the at least two regions; and in a process in which the processor obtains the second luminance value of each region based on the first luminance values of all the first pixels included in each region, the processor performs the following operations on each region:

obtaining a third luminance value of red light based on K1 first luminance values of the K1 red light pixels included in the first region, where the K1 red light pixels correspond to one third luminance value of the red light; obtaining a third luminance value of green light based on first luminance values of the K2 green light pixels included in the first region, where the K2 green light pixels correspond to one third luminance value of the green light; obtaining a third luminance value of blue light based on first luminance values of the K3 blue light pixels included in the first region, where the K3 blue light pixels correspond to one third luminance value of the blue light; and determining a second luminance value of the first region based on the third luminance value of the red light, the third luminance value of the green light, and the third luminance value of the blue light.

In an embodiment, when obtaining the third luminance value of the red light based on the K1 first luminance values of the K1 red light pixels included in the first region, the processor is specifically configured to determine that an average value of the K1 first luminance values or a maximum value in the K1 first luminance values is the third luminance value of the red light; when obtaining the third luminance value of the green light based on the first luminance values of the K2 green light pixels included in the first region, the processor is specifically configured to determine that an average value of the K2 first luminance values or a maximum value in the K2 first luminance values is the third luminance value of the green light; and when obtaining the third luminance value of the blue light based on the first luminance values of the K3 blue light pixels included in the first region, the processor is specifically configured to determine that an average value of the K3 first luminance values or a maximum value in the K3 first luminance values is the third luminance value of the blue light.

In an embodiment, when determining the second luminance value of the first region based on the third luminance value of the red light, the third luminance value of the green light, and the third luminance value of the blue light, the processor is specifically configured to obtain a weighted average value of the third luminance value of the red light, the third luminance value of the green light, and the third luminance value of the blue light; and the processor is further configured to use the weighted average value as the second luminance value of the first region.

In an embodiment, when determining the second luminance value of the first region based on the third luminance value of the red light, the third luminance value of the green light, and the third luminance value of the blue light, the processor is specifically configured to: obtain a weighted average value of the third luminance value of the red light, the third luminance value of the green light, and the third luminance value of the blue light; and compensate the weighted average value based on a location of the first region to obtain the second luminance value of the first region.

In an embodiment, in a process in which the processor obtains the second luminance value of each region based on the first luminance values of all the first pixels included in each region, the processor performs the following operation on each region:

using a first average value as a second luminance value of a first region, where the first average value is an average value of first luminance values of all first pixels in the first region, and the first region is any one of the at least two regions.

In an embodiment, in a process in which the processor obtains the second luminance value of each region based on the first luminance values of all the first pixels included in each region, the processor performs the following operation on each region:

compensating a first average value based on a location of a first region to obtain a second luminance value of the first region, where the first average value is an average value of first luminance values of all first pixels in the first region, and the first region is any one of the at least two regions.

In an embodiment, if the first region is closer to a central location of the camera, less compensation is provided for the weighted average value or the first average value; or if the first region is farther away from the central location of the camera, more compensation is provided for the weighted average value or the first average value.

In an embodiment, the processor is any one of a sensor hub sensor hub and an application processor.

According to a third aspect, a terminal is provided, including a processor, a memory, and a touchscreen, where the memory and the touchscreen are coupled to the processor, the memory is configured to store computer program code, the computer program code includes a computer instruction, and when the processor reads the computer instruction from the memory, the method according to any possible design method in the first aspect is performed.

According to a fourth aspect, a computer storage medium is provided, including a computer instruction, where when the computer instruction is run on a terminal, the terminal is enabled to perform the method according to any possible design method in the first aspect.

According to a fifth aspect, a computer program product is provided. When the computer program product is run on a computer, the computer is enabled to perform the method according to any possible design method in the first aspect.

DESCRIPTION OF EMBODIMENTS

Considering that an ambient light sensor is used to perform ambient light detection, and the ambient light sensor occupies top space of a mobile phone, and further affects a screen-to-body ratio of the mobile phone, embodiments of this application provide a method for performing ambient light detection by using a camera. In this way, the ambient light sensor may not need to be installed on the mobile phone, and a location of one component is saved for the top space of the mobile phone. This helps increase the screen-to-body ratio of the mobile phone and improve user experience.

The method provided in the embodiments of this application may be applied to a terminal having a display and a camera. The terminal may perform ambient light detection by using the camera, and adjust luminance of the display based on a result of the ambient light detection.

It should be noted that luminance of a display that is located on a same side as the camera may be adjusted based on the result of the ambient light detection performed by the camera. For example, a detection result of a front-facing camera is used to adjust luminance of a display on a front side of the mobile phone. In some scenarios, for example, when there is a relatively small difference between ambient light luminance of the front side of the mobile phone and ambient light luminance of a rear side of the mobile phone, a detection result of a rear-facing camera of the mobile phone may be alternatively used to adjust the luminance of the display on the front side of the mobile phone. Alternatively, if there is a display on the rear side of the mobile phone, luminance of the display on the rear side of the mobile phone may be adjusted based on the detection result of the rear-facing camera. This is not limited in the embodiments of this application.

For example, the terminal in this application may be a mobile phone (for example, a mobile phone 100 shown in FIG. 1), a tablet computer, a personal computer (PC), a personal digital assistant (PDA), a smartwatch, a netbook, a wearable electronic device, an augmented reality (AR) device, a virtual reality (VR) device, or the like that can install an application and display an application icon. A specific form of the terminal is not specially limited in this application.

Figure 1:
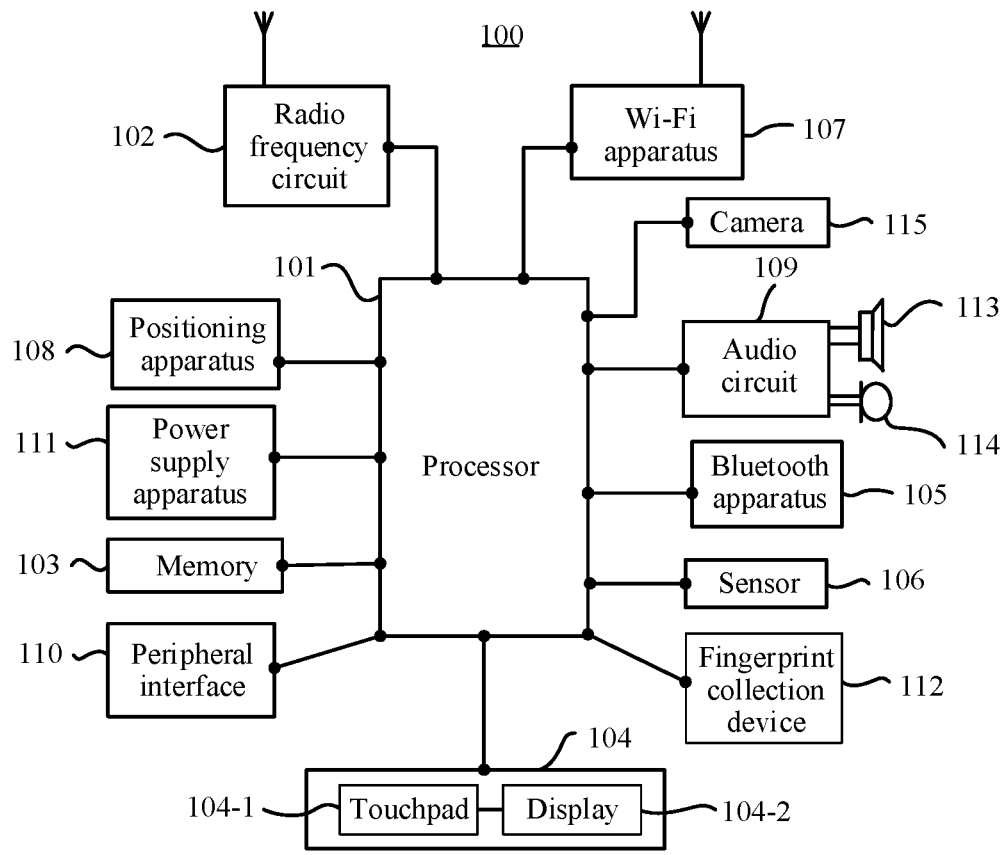
FIG. 1 is a schematic structural diagram 1 of a terminal according to an embodiment of this application.

As shown in FIG. 1, the mobile phone 100 is used as an example of the foregoing terminal. The mobile phone 100 may specifically include components such as a processor 101, a radio frequency (RF) circuit 102, a memory 103, a touchscreen 104, a Bluetooth apparatus 105, one or more sensors 106, a wireless fidelity (WI-FI) apparatus 107, a positioning apparatus 108, an audio circuit 109, a peripheral interface 110, and a power supply apparatus 111. These components may communicate with each other by using one or more communications buses or signal cables (not shown in FIG. 1). A person skilled in the art may understand that a hardware structure shown in FIG. 1 does not constitute a limitation on the mobile phone, and the mobile phone 100 may include more or fewer components than those shown in the figure, may combine some components, or may have different component arrangements.

The following describes in detail the components of the mobile phone 100 with reference to FIG. 1.

The processor 101 is a control center of the mobile phone 100. The processor 101 is connected to parts of the mobile phone 100 by using various interfaces and cables, runs or executes an application program stored in the memory 103, and invokes data stored in the memory 103, to perform various functions of the mobile phone 100 and process data. In some embodiments, the processor 101 may include one or more processing units. For example, the processor 101 may include a baseband processor and an application processor.

The radio frequency circuit 102 may be configured to send and receive a radio signal in an information receiving and sending process or a call process. Particularly, after receiving downlink data from a base station, the radio frequency circuit 102 may send the downlink data to the processor 101 for processing, and sends related uplink data to the base station. Usually, the radio frequency circuit includes but is not limited to an antenna, at least one amplifier, a transceiver, a coupler, a low noise amplifier, a duplexer, and the like. In addition, the radio frequency circuit 102 may further communicate with another device through wireless communication. The wireless communication may use any communications standard or protocol, including but not limited to global system for mobile communications, general packet radio service, code division multiple access, wideband code division multiple access, long term evolution, email, short message service, and the like.

The memory 103 is configured to store the application program and the data. The processor 101 runs the application program and the data that are stored in the memory 103, to perform various functions of the mobile phone 100 and process data. The memory 103 mainly includes a program storage area and a data storage area. The program storage area may store an operating system, and an application program required by at least one function (for example, a sound playing function or an image playing function). The data storage area may store data (for example, audio data or a phone book) created based on use of the mobile phone 100. In addition, the memory 103 may include a high-speed random access memory (RAM), or may include a nonvolatile memory such as a magnetic disk storage device, a flash storage device, or another volatile solid-state storage device. The memory 103 may store various operating systems such as an iOS® operating system developed by Apple and an Android® operating system developed by Google. The memory 103 may be independent, and is connected to the processor 101 by using the communications bus; or the memory 103 may be integrated with the processor 101. In this embodiment of this application, the memory 103 includes a storage component 207.

The touchscreen 104 may specifically include a touchpad 104-1 and a display 104-2.

The touchpad 104-1 can collect a touch event performed by a user of the mobile phone 100 on or near the touchpad 104-1 (for example, an operation performed by the user on the touchpad 104-1 or near the touchpad 104-1 by using any suitable object such as a finger or a stylus), and send collected touch information to another component (such as the processor 101). The touch event performed by the user near the touchpad 104-1 may be referred to as a floating touch. The floating touch may mean that the user does not need to directly touch the touchpad for selecting, moving, or dragging an object (for example, an icon), but the user needs only to be near the device to perform a desired function. In addition, the touchpad 104-1 may be implemented in a plurality of types such as a resistive type, a capacitive type, an infrared type, and a surface acoustic wave type.

The display (also referred to as a display) 104-2 may be configured to display information entered by the user or information provided for the user, and various menus of the mobile phone 100. The display 104-2 may be configured in a form of a liquid crystal display, an organic light-emitting diode, or the like. The touchpad 104-1 may cover the display 104-2. After detecting the touch event on or near the touchpad 104-1, the touchpad 104-1 transfers the touch event to the processor 101 to determine a type of the touch event. Then, the processor 101 may provide corresponding visual output on the display 104-2 based on the type of the touch event.

Although in FIG. 1, the touchpad 104-1 and the display 104-2 are used as two independent components to implement input and output functions of the mobile phone 100, in some embodiments, the touchpad 104-1 and the display 104-2 may be integrated to implement the input and output functions of the mobile phone 100. It may be understood that the touchscreen 104 is formed by stacking a plurality of layers of materials. Details are not described in this embodiment of this application. In addition, the touchpad 104-1 may be disposed on a front side of the mobile phone 100 in a full panel form, and the display 104-2 may also be disposed on the front side of the mobile phone 100 in a full panel form. In this way, a bezel-less structure can be implemented on the front side of the mobile phone, such as a bezel-less mobile phone.

In addition, the mobile phone 100 may further have a fingerprint recognition function. For example, a fingerprint sensor 112 may be disposed on a rear side of the mobile phone 100 (for example, below a rear-facing camera), or a fingerprint sensor 112 may be disposed on the front side of the mobile phone 100 (for example, below the touchscreen 104). For another example, a fingerprint collection device 112 may be disposed on the touchscreen 104 to implement the fingerprint recognition function. In other words, the fingerprint collection device 112 and the touchscreen 104 may be integrated to implement the fingerprint recognition function of the mobile phone 100. In this case, the fingerprint collection device 112 is disposed on the touchscreen 104, and may be a part of the touchscreen 104, or may be disposed on the touchscreen 104 in another manner. A main component of the fingerprint collection device 112 in this embodiment of this application is a fingerprint sensor. The fingerprint sensor may use any type of sensing technology, which includes but is not limited to an optical sensing technology, a capacitive sensing technology, a piezoelectric sensing technology, an ultrasonic sensing technology, or the like.

The mobile phone 100 may further include the Bluetooth apparatus 105, configured to implement data exchange between the mobile phone 100 and another short-range device (for example, a mobile phone or a smartwatch). In this embodiment of this application, the Bluetooth apparatus may be an integrated circuit, a Bluetooth chip, or the like.

The mobile phone 100 may further include at least one type of sensor 106, such as a light sensor, a motion sensor, and another sensor. Specifically, the light sensor may include a proximity sensor. The proximity sensor may power off the display when the mobile phone 100 moves to an ear. As one type of the motion sensor, an accelerometer sensor may detect acceleration values in various directions (usually on three axes). The accelerometer sensor may detect a value and a direction of gravity when the accelerometer sensor is stationary, and may be applied to an application for recognizing a mobile phone posture (such as switching between landscape mode and portrait mode, a related game, and magnetometer posture calibration), a function related to vibration recognition (such as a pedometer and a knock), and the like. Other sensors such as a gyroscope, a barometer, a hygrometer, a thermometer, and an infrared sensor may be further configured on the mobile phone 100. Details are not described herein.

The Wi-Fi apparatus 107 is configured to provide, for the mobile phone 100, network access that complies with a Wi-Fi-related standard protocol. The mobile phone 100 may access a Wi-Fi access point by using the Wi-Fi apparatus 107, to help the user to receive and send an email, browse a web page, access streaming media, and the like. The Wi-Fi apparatus 107 provides wireless broadband internet access for the user. In some other embodiments, the Wi-Fi apparatus 107 may also be used as a Wi-Fi wireless access point, and may provide Wi-Fi network access for another device.

The positioning apparatus 108 is configured to provide a geographic location for the mobile phone 100. It may be understood that the positioning apparatus 108 may be a receiver of a positioning system such as a global positioning system (GPS), a BeiDou navigation satellite system, or a Russian GLONASS. After receiving the geographic location sent by the positioning system, the positioning apparatus 108 sends the information to the processor 101 for processing, or sends the information to the memory 103 for storage. In some other embodiments, the positioning apparatus 108 may be alternatively a receiver of an assisted global positioning system (AGPS). The AGPS system assists the positioning apparatus 108 as an assisted server, to implement ranging and positioning services. In this case, the assisted positioning server communicates with a device such as the positioning apparatus 108 (namely, the GPS receiver) of the mobile phone 100 through a wireless communications network, to provide positioning assistance. In some other embodiments, the positioning apparatus 108 may be a positioning technology based on a Wi-Fi access point. Each Wi-Fi access point has a globally unique media access control (MAC) address, and the device can scan and collect a broadcast signal of a nearby Wi-Fi access point when Wi-Fi is enabled. Therefore, a MAC address broadcast by the Wi-Fi access point can be obtained. The device sends such data (for example, the MAC address) that can identify the Wi-Fi access point to a location server through the wireless communications network. The location server retrieves a geographic location of each Wi-Fi access point, calculates a geographic location of the device with reference to strength of the Wi-Fi broadcast signal, and sends the geographic location of the device to the positioning apparatus 108 of the device.

The audio circuit 109, a speaker 113, and a microphone 114 may provide an audio interface between the user and the mobile phone 100. The audio circuit 109 may convert received audio data into an electrical signal and transmit the electrical signal to the speaker 113, and the speaker 113 converts the electrical signal into a sound signal for output. In addition, the microphone 114 converts a collected sound signal into an electrical signal, and the audio circuit 109 receives the electrical signal, converts the electrical signal into audio data, and then outputs the audio data to the RF circuit 102, to send the audio data to, for example, another mobile phone, or outputs the audio data to the memory 103 for further processing.

The peripheral interface 110 is configured to provide various interfaces for an external input/output device (for example, a keyboard, a mouse, an external display, an external memory, or a subscriber identification module card). For example, the mobile phone 100 is connected to the mouse by using a universal serial bus (USB) interface, or the mobile phone 100 is connected, by using a metal contact on a card slot of the subscriber identification module card, to the subscriber identification module (SIM) card provided by a telecommunications operator. The peripheral interface 110 may be configured to couple the external input/output peripheral device to the processor 101 and the memory 103.

The mobile phone 100 may further include the power supply apparatus 111 (for example, a battery and a power management chip) that supplies power to the components. The battery may be logically connected to the processor 101 by using the power management chip, so that functions such as charging management, discharging management, and power consumption management are implemented by using the power supply apparatus 111.

The mobile phone 100 may further include one or more cameras 115. In an embodiment, the mobile phone may include one or more front-facing cameras, or may include one or more rear-facing cameras, or may include one or more front-facing cameras and one or more rear-facing cameras. For a specific structure of the camera 115, refer to the following description of FIG. 2. Details are not described herein.

Although not shown in FIG. 1, the mobile phone 100 may further include a flash, a micro projection apparatus, a near field communication (Near Field Communication, NFC) apparatus, and the like. Details are not described herein.

All methods in the following embodiments may be implemented on the mobile phone 100 having the foregoing hardware structure.

To better understand an ambient light detection method provided in the embodiments of this application, a structure and a working principle of a camera in a terminal are first briefly described.

Figure 2:
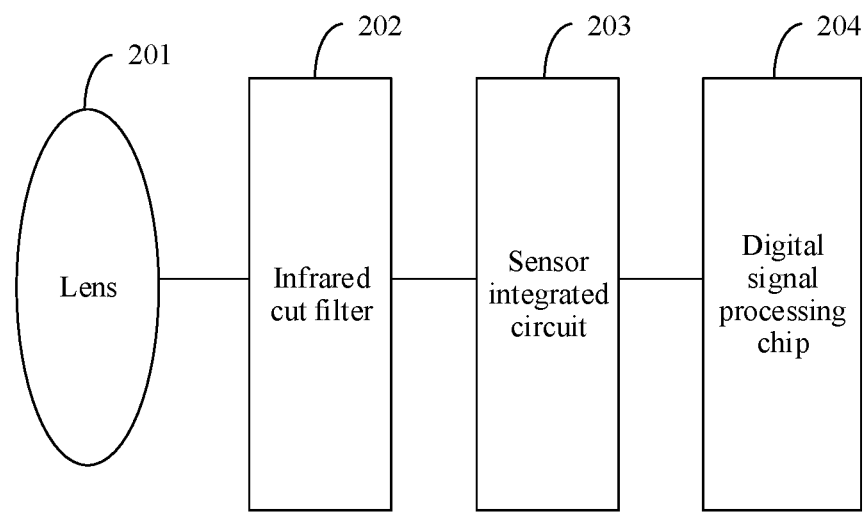
FIG. 2 is a schematic structural diagram of a camera of a terminal according to an embodiment of this application.

FIG. 2 is a schematic structural diagram of a camera 115 in a mobile phone 100. Usually, the camera mainly includes a lens (lens) 201, an infrared cut (IR cut) filter 202, a sensor integrated circuit (Sensor IC) 203, and a digital signal processing (DSP) chip 204. It should be noted that in some embodiments, the sensor IC and the DSP of the camera are integrated into one chip. This is not limited in this embodiment of this application.

The lens 201 has a lens structure, usually includes one or more lenses, and determines a daylighting rate of a sensor. Usually, the lens includes a plastic lens or a glass (GLASS) lens. Common lens structures include 1P, 2P, 1G1P, 1G3P, 2G2P, 4G, and the like.

The infrared cut filter 202 is configured to perform color separation on light passing through the lens 201. Currently, there are two color separation methods for the infrared cut filter: an RGB (Red Green Blue) primary color separation method (namely, a three-primary-color separation method) and a CMYK (Cyan Magenta Yellow Key-Plate) complementary color separation method. Because any color of natural light may be obtained by mixing three light colors R, G, and B in different ratios, in this embodiment of this application, the natural light may be divided into three types of monochromatic light R, G, and B by using the infrared cut filter 202.

The sensor integrated circuit 203 includes a sensor (sensor), and may also be referred to as an image sensor, a camera sensor, or a photosensitive sensor. The sensor is a semiconductor chip, and a surface of the sensor includes a plurality of photosensitive elements, for example, a photodiode. The photosensitive element receives monochromatic light filtered by the light filter, and then generates a corresponding electric charge. In an embodiment, the sensor converts the light from the lens 201 into an electrical signal, and then converts the electrical signal into a digital signal through internal analog-to-digital (Analog to Digital, AD) conversion. In this case, data of the digital signal is referred to as raw data (raw data). Each photosensitive element can sense only monochromatic light, for example, the R light, the B light, or the G light.

It should be noted that the camera includes a plurality of pixels. Each pixel may include one of the photosensitive elements. Alternatively, each pixel includes one photosensitive element and one light filter corresponding to the photosensitive element. Alternatively, in addition to including one photosensitive element and one light filter corresponding to the photosensitive element, each pixel may further include another related component.

The digital signal processing chip 204 is configured to: obtain the raw data from the sensor, perform a series of processing on the raw data, and send processed data to a processor of a video output device. Finally, the video output device displays an image. The digital signal processing chip 204 is further configured to refresh the sensor after sending the data to the processor, so that the sensor obtains a next group of raw data.

The data signal processing chip 204 includes an image signal processor (ISP), configured to convert the obtained raw data into a format supporting display, for example, a YUV format or an RGB format. The data signal processing chip 204 further includes a camera interface (CAMIF), specifically configured to send data processed by the ISP to a processor of the mobile phone.

The working principle of the camera may be as follows: After passing through the lens 201, light outside the mobile phone is filtered by the infrared cut filter 202 and then irradiates onto a surface of the sensor. The sensor converts the received light into the electrical signal, and then converts the electrical signal into the digital signal through the internal AD conversion to obtain the raw data. If no DSP is integrated into the sensor, the raw data is transmitted to the processor of the mobile phone. In this case, a data format is a format of the raw data. If the DSP is integrated into the sensor, the obtained raw data is processed and the data in the YUV format or the RGB format is output. Finally, the processor of the mobile phone sends the data to the video output device (for example, a framebuffer) to display the image.

In an embodiment of this application, the following describes an example in which luminance of a display is adjusted based on a luminance value of ambient light detected by a front-facing camera.

A plurality of pixels included in a sensor of the front-facing camera on a terminal are divided into N regions, where N is an integer greater than 1. A luminance value of each region is obtained, and the luminance value of the ambient light is determined based on the luminance value of each region. Then, the luminance of the display is adjusted based on the determined luminance value of the ambient light.

Figure 3A:
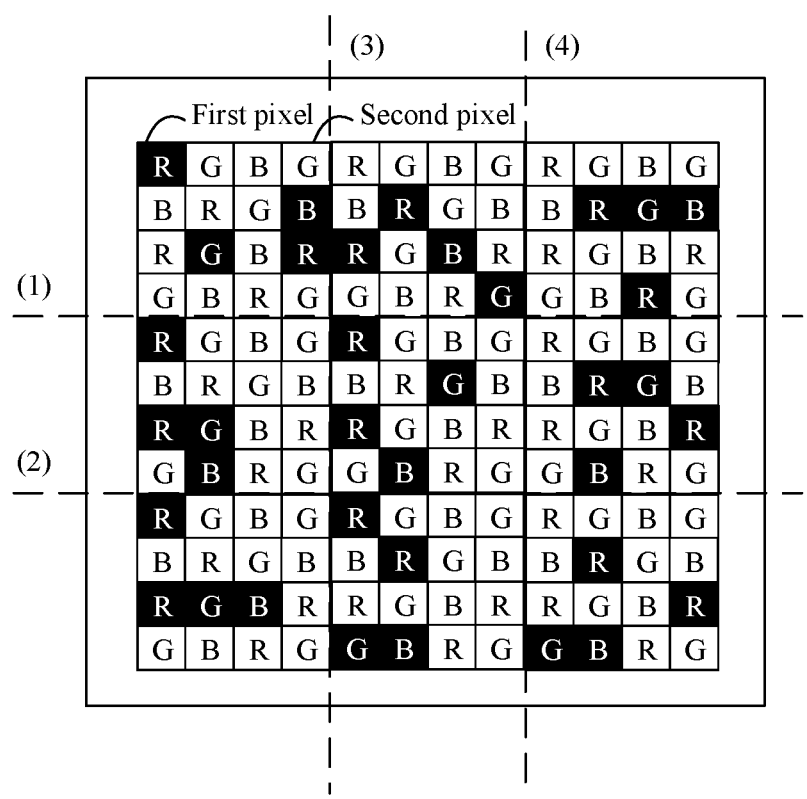
FIG. 3a is a schematic diagram 1 of region division of a camera sensor of a terminal according to an embodiment of this application.
Figure 3B:
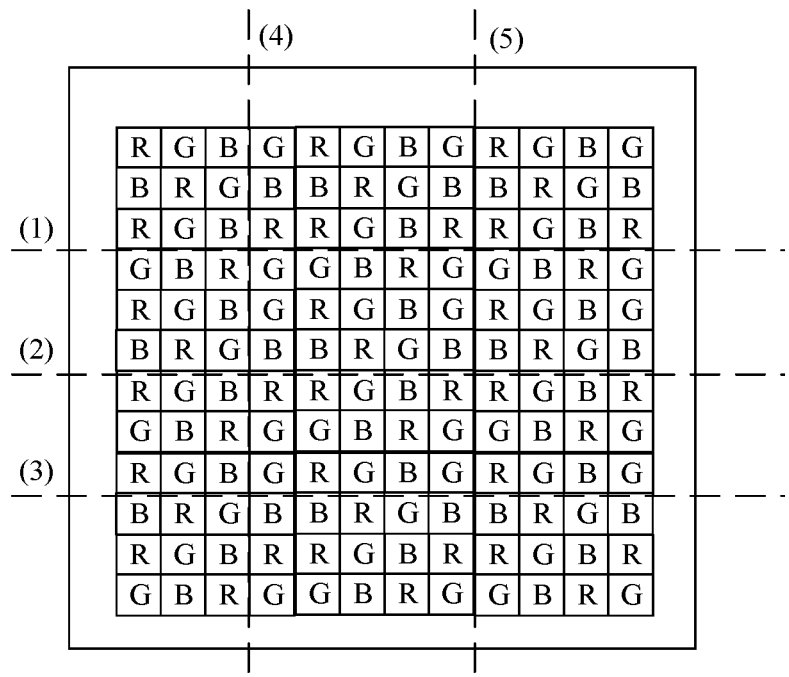
FIG. 3b is a schematic diagram 2 of region division of a camera sensor of a terminal according to an embodiment of this application.

A method for the division into the N regions may be equal division. In other words, areas of all regions are the same. Alternatively, division may be performed based on an optical characteristic of a lens. A division principle and a quantity of pixels in each region after the division are not limited in this embodiment of this application. For example, as shown in FIG. 3a, the pixels in the sensor are evenly divided into nine regions, sizes of the nine regions are the same, and quantities of pixels included in the regions are the same. As shown in FIG. 3b, the pixels in the sensor are divided into 12 regions, sizes of the 12 regions are different, and quantities of pixels included in the regions are different.

It should be noted that the region division herein is not physically separating pixels in different regions, but is equivalent to grouping the plurality of pixels. A grouping principle is that some adjacent pixels are grouped into one group, and the pixels in this group are equivalent to being in one region. In addition, the region division or grouping herein is preset.

It may be understood that, it can be learned from the optical characteristic of the camera that light reaching the lens has different distributions. In other words, attenuation of the light differs in different regions of the camera. Therefore, region division is performed to detect luminance of light collected by the camera, and compensation of a different degree is performed on a detected luminance value of each region. This helps improve accuracy of the detected luminance value.

For example, luminance values of all regions may be compensated according to a preset compensation rule, and a maximum value in luminance values of the regions after the compensation is determined as the luminance value of the current ambient light.

Figure 5:
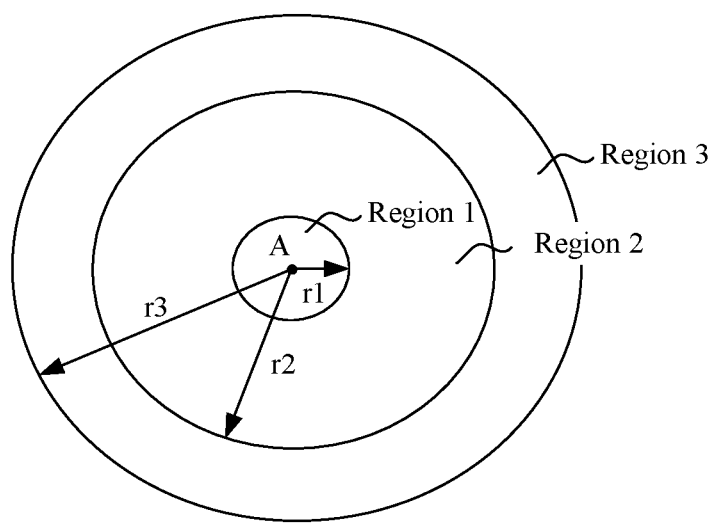
FIG. 5 is a schematic diagram of a compensation method for different regions of a camera according to an embodiment of this application.

The preset compensation rule may be that: a luminance value obtained by detecting a region located at a central location of the camera is zero or is slightly compensated, and a luminance value obtained by detecting a region that is farther away from the central location is more compensated. A distance from a region to the central location may be a distance from a center point of the region to the central location. As shown in FIG. 5, it is assumed that a point A is the central location. A circular region (a region 1) that uses the point A as a central point and whose radius is r1 may be considered as a central region. Compensation may not be performed on the central region, or a compensation value is very small (less than P1 in the following). A compensation value for a region (a region 2) with a radius greater than r1 and less than r2 from the point A is P1, and a compensation value for a region (a region 3) with a radius greater than r2 and less than r3 from the point A is P2, where $r1<r2<r3$, and $P1<P2$.

In an embodiment, luminance values of the central location of the camera and an edge location of a field of view (FOV) may be tested in advance, to obtain a difference or a ratio of the two luminance values, and the difference or the ratio of the two luminance values is used as a compensation basis. For example, in radiation of a light source with fixed luminance at a fixed location, the luminance value of the central location of the camera is read as Q1 lux (a lighting unit), and the luminance value of the edge location of the FOV of the camera is read as Q2 lux. The difference (Q) between Q1 and Q2 or the ratio of Q1 to Q2 may be determined as the compensation basis based on a factor such as the optical characteristic of the camera or a characteristic of the light source. It is assumed that the difference (Q) between Q1 and Q2 is used as the compensation basis. In this case, when the terminal performs ambient light detection, an actually measured luminance value of the central location is Q3 lux, and an actually measured luminance value of the edge location of the FOV is Q4 lux. In this case, compensation may not be performed on the actually measured Q3, in other words, the current luminance value of the central location of the camera is determined as Q3 lux. Compensation is performed on the actually measured Q4, to obtain, for example, (Q4+Q) lux, in other words, the current luminance value of the edge location of the FOV of the camera is determined as (Q4+Q) lux.

In an embodiment, after region division is performed on the sensor, the light source may be identified based on an optical signal received in each region, and then different compensation rules or display luminance adjustment policies are used. For example, if a luminance value or luminance values of only one region or only several adjacent regions in all regions of the sensor is or are relatively large, it may be determined that the light source is a point light source. Relatively large compensation may be performed on the luminance value measured at the edge of the FOV range of the camera. If luminance values of several non-adjacent regions in all regions of the sensor are relatively large, it may be determined that the light source is a multi-point light source. Gradient compensation may be performed, based on distribution of a plurality of light sources, on the luminance values measured by the sensor. A specific compensation method is not limited. If a luminance value of each of all the regions of the sensor changes greatly and complies with a specific rule, it may be determined that the terminal is in a moving state, and the luminance of the display may not be adjusted.

In an embodiment, it can be learned from the optical characteristic of the camera that when the light source is located in the FOV range of the camera, the luminance value that is of the ambient light and that is detected by the camera is a relatively stable value. When the light source is located outside the FOV range of the camera, the luminance value that is of the ambient light and that is detected by the camera decreases sharply. Therefore, the FOV range of the camera may be increased, to improve accuracy of the luminance value that is of the ambient light and that is determined by the terminal.

In an embodiment, for any one of the N regions, a luminance value of the region may be obtained by using luminance values of M pixels in the region. For example, the luminance values of the M pixels in the region are read, and then the luminance value of the region is determined based on the luminance values of the M pixels. For example, weighted calculation may be performed on the luminance values of the M pixels, to obtain the luminance value of the region. A quantity of pixels included in the region is greater than or equal to M.

Herein, M may be an integer greater than or equal to 3. In one region, the read luminance values of the M pixels may include at least one value of R light, at least one value of G light, and at least one value of B light. In this way, when the luminance value of the region is calculated, different weights may be added to the luminance values of the R light, the G light, and the B light based on a situation, and the luminance values may be added, to obtain the luminance value of the region.

It should be noted that each region in the terminal includes a plurality of first pixels and a plurality of second pixels. The first pixel is a pixel that is specified by the terminal to detect the ambient light. Herein, the read M pixels in each region are M first pixels. The second pixel is a pixel that is not specified for ambient light detection. The terminal uses all pixels, including the first pixels and the second pixels, for a photographing function.

When the terminal enables a function of automatically adjusting the display luminance of the display, the terminal needs to perform ambient light detection. In this case, all first pixels in the terminal are in an activated state, namely, a state in which the first pixels can work. When the terminal enables the photographing function, all the first pixels and all second pixels are in the activated state. When the terminal enables the function of automatically adjusting the display luminance of the display but does not enable the photographing function, the first pixels are in the activated state, and the second pixels are in an inactivated state. If the terminal enables the function of automatically adjusting the display luminance of the display, when the terminal enables the camera function, the terminal activates all the second pixels (the first pixels have been activated when the function of automatically adjusting the display luminance of the display is enabled).

As shown in FIG. 3a, some first pixels are preset in each region. For example, two R light pixels, one G light pixel, and one B light pixel are preset in each region. In this embodiment of this application, a quantity of first pixels in each region is not limited, and a specific quantity of R light pixels, a specific quantity of G light pixels, and a specific quantity of B light pixels are not limited. Quantities of first pixels in any two regions may also be different.

It should be noted that values of M may be different in different regions. For example, in a first region, luminance values of M1 pixels may be used for calculation, and in a second region, luminance values of M2 pixels may be used for calculation, where M1 and M2 may be equal or unequal. In addition, in a same region, a quantity of read luminance values of R light pixels, a quantity of read luminance values of G light pixels, and a quantity of read luminance values of B light pixels may be the same or may be different. For example, in a region, luminance values of K1 R light pixels, luminance values of K2 G light pixels, and luminance values of K3 B light pixels are read, where K1, K2, and K3 may be the same or may be different.

Figure 3C:
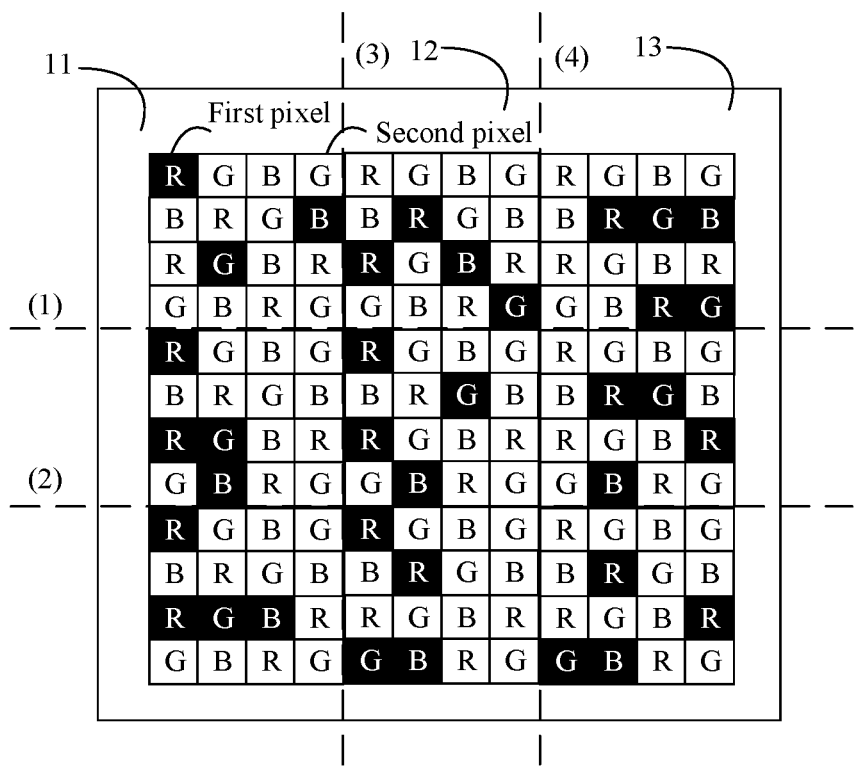
FIG. 3c is a schematic diagram 3 of region division of a camera sensor of a terminal according to an embodiment of this application.

As shown in FIG. 3c, in a first region 11 in the first row, there are three pre-specified first pixels in total: one R light pixel, one G light pixel, and one B light pixel. In a second region 12 in the first row, there are four pre-specified first pixels in total: two R light pixels, one G light pixel, and one B light pixel. In a third region 13 in the first row, there are five pre-specified first pixels in total: two R light pixels, two G light pixels, and one B light pixel. For a first pixel specified in another region, refer to the accompanying drawings. Details are not described.

For example, a same luminance value brings different visual experience to a user at different color temperatures. Therefore, different weights may be added to the luminance values of the R light, the G light, and the B light based on the color temperatures, and then the luminance values of the R light, the G light, and the B light are added based on the weights to obtain the luminance value of the region. Finally, the luminance value of the current ambient light is obtained. For example, when the color temperature is relatively high, for example, in an outdoor environment with strong sunlight, an image on the display looks relatively red. Therefore, when the luminance value is calculated, a weight of the luminance value of the R light may be increased. In this way, a luminance value obtained through calculation is relatively large. Therefore, when adjusting the luminance of the display based on the calculated luminance value, the terminal may decrease the luminance to improve user experience. When the color temperature is relatively low, for example, in cold weather, the image on the display looks relatively blue. Therefore, when the luminance value is calculated, a weight of the luminance value of the B light may be increased. In this way, a luminance value obtained through calculation is relatively large. Therefore, when adjusting the luminance of the display based on the calculated luminance value, the terminal may decrease the luminance to improve user experience.

For example, it is assumed that in a condition of a color temperature 1, a weight corresponding to the R light is H1, a weight corresponding to the G light is J1, and a weight corresponding to the B light is K1, where H1+J1+K1=1. In this case, a current luminance value of a region=a luminance value of R light×H1+a luminance value of G light×J1+a luminance value of B light×K1. The luminance value of the R light may be a maximum value (or an average value) in luminance values of all preset R light in the region. The luminance value of the G light may be a maximum value (or an average value) in luminance values of all preset G light in the region. The luminance value of the B light may be a maximum value (or an average value) in luminance values of all preset B light in the region.

For another example, it is assumed that in a condition of a color temperature 2, a weight corresponding to the R light is H2, a weight corresponding to the G light is J2, and a weight corresponding to the B light is K2, where H2+J2+K2=1. Herein, H1 is different from H2, J1 is different from J2, and K1 is different from K2. In this case, a current luminance value of a region=a luminance value of R light× H2+a luminance value of G light×J2+a luminance value of B light×K2. The luminance value of the R light may be a maximum value (or an average value) in luminance values of all preset R light in the region. The luminance value of the G light may be a maximum value (or an average value) in luminance values of all preset G light in the region. The luminance value of the B light may be a maximum value (or an average value) in luminance values of all preset B light in the region.

For example, because different light sources include different components of the R light, the G light, and the B light, different weights may be added to the luminance values of the R light, the G light, and the B light based on characteristics of the different light sources. Then, the luminance values of the R light, the G light, and the B light are added based on the weights to obtain the luminance value of the region. Finally, the luminance value of the current ambient light is obtained. For example, for a light source including more R light, a weight of the R light may be increased when a luminance value of a region is calculated. In this way, a luminance value obtained through calculation is relatively large. This helps avoid a problem that after the R light in the light source is filtered out, a calculated luminance value is less than an actual luminance value, and consequently, there is a relatively poor effect of adjusting the luminance of the display based on the calculated luminance value. Therefore, the terminal increases the weight of the R light to obtain a larger luminance value through calculation, and then may decrease the luminance when adjusting the luminance of the display based on the calculated luminance value. This helps improve user experience. Similarly, for a light source including more G light, a weight of the R light may be increased when a luminance value of a region is calculated. For a light source including more B light, a weight of the R light may be increased when a luminance value of a region is calculated.

The following describes a specific implementation process in which region division is performed on a camera for ambient light detection.

In the prior art, when a terminal enables a photographing function, a sensor controls all pixels (including a first pixel and a second pixel) to be in an activated state, a luminance value of an entire image is output to a register by using all the pixels, and the terminal reads the register to obtain the luminance value of the image, and displays the image based on the luminance value. When the terminal disables the photographing function, the sensor controls all the pixels to be in an inactivated state, and does not need to perform light sensing and corresponding processing on light irradiating on the sensor.

Figure 6:
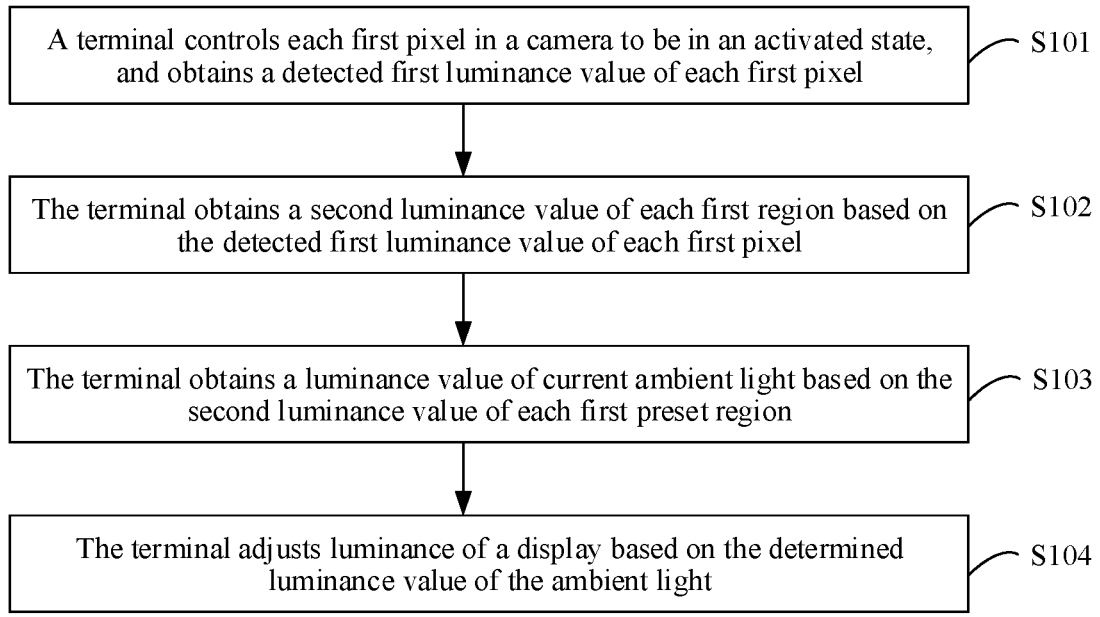
FIG. 6 is a schematic flowchart of an ambient light detection method according to an embodiment of this application.

FIG. 6 is a flowchart of an ambient light detection method according to an embodiment of this application. The method specifically includes the following operations.

S101. A terminal controls each first pixel in a camera to be in an activated state, and obtains a detected first luminance value of each first pixel.

Pixels in the camera are divided into at least two regions, each region includes a plurality of pixels, and at least three pixels in the plurality of pixels in each region are used as first pixels. In a scenario in which ambient light luminance needs to be detected, each first pixel is in the activated state. A detected light luminance value of the first pixel in the activated state is the first luminance value.

At a moment, each first pixel corresponds to one first luminance value.

It may be understood that a sensor may control a state of each pixel included in the sensor to be the activated state or an inactivated state. A pixel in the activated state may receive light, perform photoelectric conversion to convert an optical signal into an electrical signal, and perform analog-to-digital conversion on the electrical signal to convert the electrical signal into a digital signal. The digital signal includes a luminance value of the pixel. Then, the luminance value of the pixel is stored in a register, and a sensor hub may obtain the luminance value by reading the value in the register by using, for example, an inter-integrated circuit (IIC) bus.

Therefore, the terminal may preset some pixels (that is, first pixels) in each region, to detect ambient light. When the terminal enables an ambient light detection function and a mobile phone is screen-on, the sensor controls these preset pixels to be in the activated state to detect a luminance value of current light, and stores a detected first luminance value of each pixel into a register (for example, each first pixel may correspond to one register).

S102. The terminal obtains a second luminance value of each region based on the detected first luminance value of each first pixel.

Each region includes a plurality of first pixels. A luminance value, namely, a second luminance value, of a region may be obtained based on detected first luminance values of all first pixels in the region. It can be learned that one region corresponds to one second luminance value. In other words, a second luminance value obtained by using a plurality of first luminance values of a region is used to represent a luminance value of the region. It should be noted that in a specific implementation process, the terminal may not perform a specific region division action, but may group all first pixels in the terminal in advance. Each group includes a plurality of first pixels, and each group corresponds to one region. Then, a second luminance value corresponding to each group is obtained based on first luminance values corresponding to all the first pixels in the group, and the second luminance value is equivalent to a second luminance value of a region corresponding to the group.

One of the regions is used as an example for description.

In some examples, the sensor hub of the terminal may read first luminance values in each register, and report the first luminance values to a processor (for example, an application processor) of the terminal. The processor of the terminal performs weight calculation to obtain a luminance value (that is, a second luminance value) of the region.

In some examples, after reading first luminance values in each register, the sensor in the camera of the terminal may perform weight calculation on the first luminance values to obtain a luminance value (that is, a second luminance value) of the region. Then, the sensor hub reads the second luminance value, and reports the second luminance value to a processor of the terminal.

It should be noted that a body performing weight calculation in this step is not limited in this embodiment of this application.

It should be noted that, when the sensor hub reads the luminance values in each register, a used communications protocol may be IIC, or may be another communications protocol such as serial peripheral interface (SPI).

S103. The terminal obtains a luminance value of current ambient light based on the second luminance value of each region.

Each region corresponds to one second luminance value. Therefore, the terminal selects a maximum value from second luminance values corresponding to all regions as the luminance value of the current ambient light. In an embodiment, because attenuation of light differs in different regions of the camera, luminance values of some regions may be compensated, and a maximum value is selected from second luminance values obtained after the compensation as the luminance value of the current ambient light. For example, the processor of the terminal performs compensation calculation on the luminance value of each region according to a specific compensation rule, to obtain a luminance value of each region after compensation. Finally, the maximum luminance value is selected from the luminance values, of the regions, obtained after the compensation as the luminance value of the current ambient light.

S104. The terminal adjusts luminance of a display based on the determined luminance value of the ambient light.

In this way, a display effect of the display is improved, and user experience is improved.

It should be noted that, in the embodiments of this application, a photographing function of the camera and an ambient light detection function of the camera are two independent functions, and do not affect each other. After the terminal enables a function of automatically adjusting ambient light, when the terminal is powered on and is screen-on, ambient light detection may be always performed by using the camera, and is not affected by a case of whether the camera performs photographing. In an ambient light detection process, the camera can perform photographing. In addition, in a photographing process of the camera, the camera can also detect ambient light intensity. Registers corresponding to the photographing function and the ambient light detection function of the camera may be separately disposed, and IICs corresponding to the two functions may also be separately disposed, so that the two functions can be independently implemented.

Figure 4:
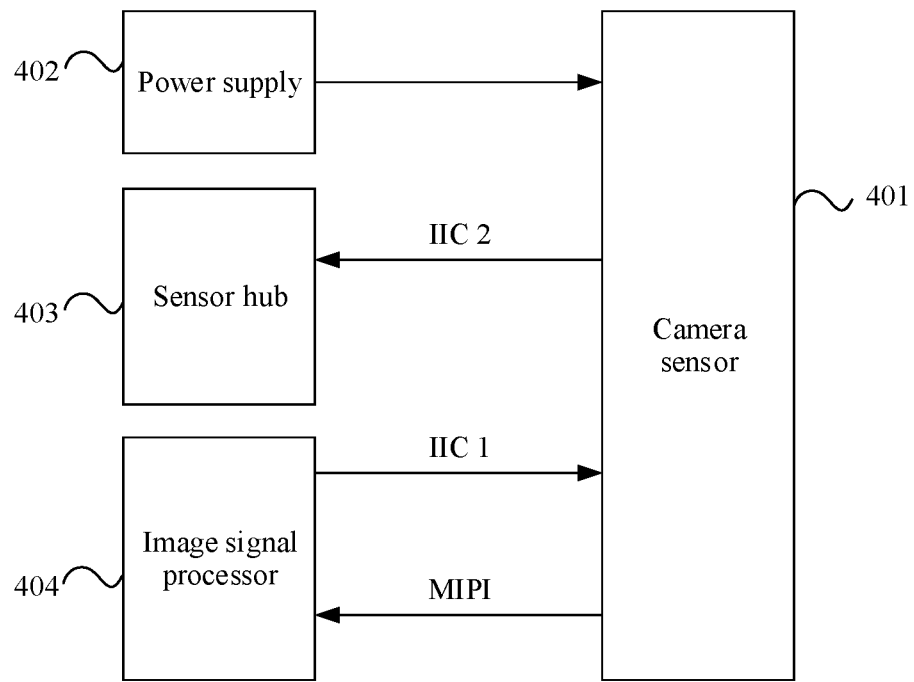
FIG. 4 is a schematic structural diagram 2 of a terminal according to an embodiment of this application.

For example, as shown in FIG. 4, in the embodiments of this application, when the terminal performs photographing, RGB data generated after all pixels in the camera sense light may be stored in a first register. An image signal processor 404 configures a photography parameter of a camera sensor 401 by using an IIC 1. The image signal processor 404 reads the RGB data in the first register by using, for example, a mobile industry processor interface (MIPI) 1, and performs image processing based on the data.

Further, as shown in FIG. 4, when the terminal performs ambient light detection, after first pixels in the camera sense light, obtained luminance data is stored in a second register. The second register is different from the first register, and there may be a plurality of first registers and a plurality of second registers. A quantity of registers is not limited in this application. A sensor hub 403 reads a luminance value in each second register of the camera sensor 401 by using, for example, an IIC 2.

It can be learned that the photographing process of the terminal and the ambient light detection process of the terminal are two independent processes, and do not interfere with each other. In this way, a decoupling design is implemented when the camera performs photographing and ambient light detection. Therefore, when the camera is in a standby mode, the terminal can also perform ambient light detection.

It can be understood that, to implement the foregoing functions, the terminal and the like include corresponding hardware structures and/or software modules for performing the functions. A person of ordinary skill in the art should easily be aware that, in combination with the examples described in the embodiments disclosed in this specification, units, algorithms, and operations may be implemented by hardware or a combination of hardware and computer software in the embodiments of this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the embodiments of the present invention.

In the embodiments of this application, the terminal and the like may be divided into function modules based on the foregoing method examples. For example, function modules corresponding to various functions may be obtained through division, or two or more functions may be integrated into one processing module. The integrated module may be implemented in a form of hardware, or may be implemented in a form of a software function module. It should be noted that, in the embodiments of the present invention, division into the modules is an example, and is merely logical function division. In actual implementation, another division manner may be used.

Figure 7:
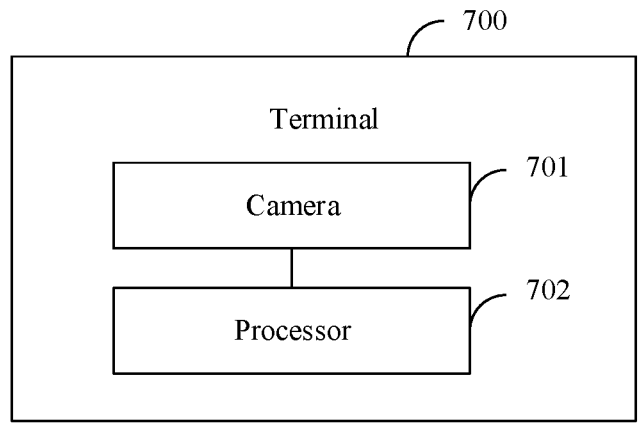
FIG. 7 is a schematic structural diagram 3 of a terminal according to an embodiment of this application.

When the function modules corresponding to various functions are obtained through division, FIG. 7 is a schematic diagram of a possible structure of the terminal in the foregoing embodiments. As shown in FIG. 7, the terminal 700 includes a camera 701 and a processor 702.

The camera 701 is configured to support the terminal in performing operation S101 in FIG. 6, and/or is configured to perform another process of the technology described in this specification. The processor 702 is configured to support the terminal in performing operations S102 to S104 in FIG. 6, and/or is configured to perform another process of the technology described in this specification.

All related content of the steps in the foregoing method embodiment may be cited in function descriptions of the corresponding function modules. Details are not described herein.

Certainly, the terminal 700 may further include a communications unit, configured to perform interaction between the terminal and another device. The terminal 700 may further include a storage unit, configured to store program code and data of the terminal. In addition, functions that can be specifically implemented by the function units include but are not limited to functions corresponding to the method steps in the foregoing embodiments. For detailed description of other units of the terminal 700, refer to the detailed descriptions of the method steps corresponding to the units. Details are not described herein in this embodiment of this application.

When an integrated unit is used, the foregoing camera may be a camera module of the terminal, and the processor 702 may be a processing module of the terminal. The communications unit may be a communications module of the terminal, for example, an RF circuit, a Wi-Fi module, or a Bluetooth module. The storage unit may be a storage module of the terminal.

Figure 8:
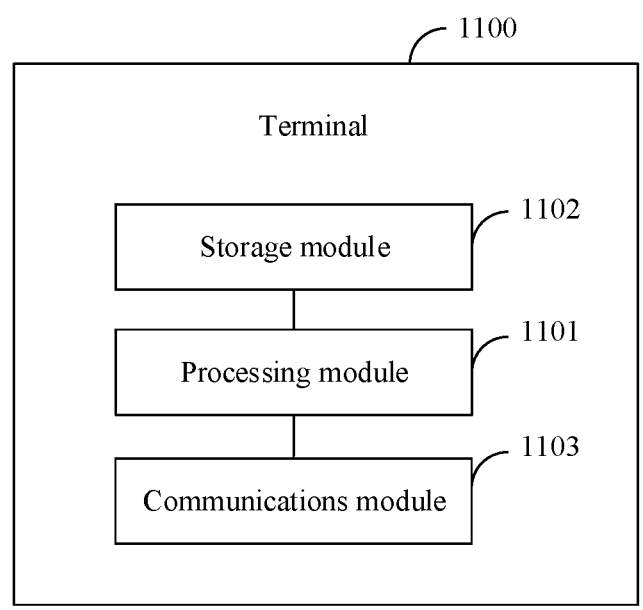
FIG. 8 is a schematic structural diagram 4 of a terminal according to an embodiment of this application.

FIG. 8 is a schematic diagram of a possible structure of the terminal in the foregoing embodiments. The terminal 1100 includes a processing module 1101, a storage module 1102, and a communications module 1103. The processing module 1101 is configured to perform control and management on an action of the terminal. The storage module 1102 is configured to store program code and data of the terminal. The communications module 1103 is configured to communicate with another terminal. The processing module 1101 may be a processor or a controller, such as a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The processing module 1101 may implement or execute various example logical blocks, modules, and circuits described with reference to content disclosed in the present invention. The processor may be a combination of processors implementing a computing function, for example, a combination of one or more microprocessors, or a combination of a DSP and a microprocessor. The communications module 1103 may be a transceiver, a transceiver circuit, a communications interface, or the like. The storage module 1102 may be a memory.

When the processing module 1101 is a processor (the processor 101 shown in FIG. 1), the communications module 1103 is an RF transceiver circuit (the radio frequency circuit 102 shown in FIG. 1), and the storage module 1102 is a memory (the memory 103 shown in FIG. 1), the terminal provided in this embodiment of this application may be the terminal 100 in FIG. 1. The communications module 1103 may include the RF circuit, and may further include a Wi-Fi module and a Bluetooth module. The communications module such as the RF circuit, the Wi-Fi module, and the Bluetooth module may be collectively referred to as a communications interface. The processor, the communications interface, and the memory may be coupled together by using a bus.

The foregoing descriptions about implementations allow a person skilled in the art to understand that, for the purpose of convenient and brief description, division into the foregoing function modules is only an example for illustration. In actual application, the foregoing functions can be allocated to different function modules for implementation based on a requirement. To be specific, an inner structure of an apparatus is divided into different function modules to implement all or some of the functions described above. For a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the division into the modules or units is merely logical function division. There may be another division manner in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. An ambient light detection method, comprising:
    obtaining, by a terminal, a first luminance value of each first pixel, wherein each first pixel corresponds to one first luminance value, wherein the terminal comprises a camera and a display, wherein the camera comprises at least two regions and each region comprises at least one first pixel;
    obtaining, by the terminal, a second luminance value of each region based on first luminance values of all first pixels comprised in each region, wherein each region corresponds to one second luminance value;
    obtaining, by the terminal, a luminance value of current ambient light based on all the second luminance values, wherein the luminance value is stored in a register; and
    adjusting, by the terminal, luminance of the display based on the luminance value of the ambient light.

2. The method according to claim 1, wherein all first pixels in a first region comprise K1 red light pixels, K2 green light pixels, and K3 blue light pixels, and the first region is any one of the at least two regions; and
    wherein obtaining the second luminance value of each region based on the first luminance values of all the first pixels comprised in each region comprises:
    obtaining, by the terminal, a third luminance value of red light based on K1 first luminance values of the K1 red light pixels comprised in the first region, wherein the K1 red light pixels correspond to one third luminance value of the red light;
    obtaining, by the terminal, a third luminance value of green light based on first luminance values of the K2 green light pixels comprised in the first region, wherein the K2 green light pixels correspond to one third luminance value of the green light;
    obtaining, by the terminal, a third luminance value of blue light based on first luminance values of the K3 blue light pixels comprised in the first region, wherein the K3 blue light pixels correspond to one third luminance value of the blue light; and
    determining, by the terminal, a second luminance value of the first region based on the third luminance value of the red light, the third luminance value of the green light, and the third luminance value of the blue light.

3. The method according to claim 2, wherein
    the obtaining, by the terminal, a third luminance value of red light based on K1 first luminance values of the K1 red light pixels comprised in the first region comprises: determining, by the terminal, that an average value of the K1 first luminance values or a maximum value in the K1 first luminance values is the third luminance value of the red light;
    the obtaining, by the terminal, a third luminance value of green light based on K2 first luminance values of the K2 green light pixels comprised in the first region comprises: determining, by the terminal, that an average value of the K2 first luminance values or a maximum value in the K2 first luminance values is the third luminance value of the green light; and
    the obtaining, by the terminal, a third luminance value of blue light based on K3 first luminance values of the K3 blue light pixels comprised in the first region comprises: determining, by the terminal, that an average value of the K3 first luminance values or a maximum value in the K3 first luminance values is the third luminance value of the blue light.

4. The method according to claim 2, wherein the determining, by the terminal, a second luminance value of the first region based on the third luminance value of the red light, the third luminance value of the green light, and the third luminance value of the blue light comprises:
  obtaining, by the terminal, a weighted average value of the third luminance value of the red light, the third luminance value of the green light, and the third luminance value of the blue light; and
  using, by the terminal, the weighted average value as the second luminance value of the first region.

5. The method according to claim 2, wherein the determining, by the terminal, a second luminance value of the first region based on the third luminance value of the red light, the third luminance value of the green light, and the third luminance value of the blue light comprises:
  obtaining, by the terminal, a weighted average value of the third luminance value of the red light, the third luminance value of the green light, and the third luminance value of the blue light; and
  compensating, by the terminal, the weighted average value based on a location of the first region to obtain the second luminance value of the first region.

6. The method according to claim 5, wherein
  if the first region is closer to a central location of the camera, less compensation is provided for the weighted average value or a first average value; or
  if the first region is farther away from the central location of the camera, more compensation is provided for the weighted average value or the first average value.

7. The method according to claim 1, wherein in a process in which the terminal obtains the second luminance value of each region based on the first luminance values of all the first pixels comprised in each region, the terminal performs the following operation on each region:
  using, by the terminal, a first average value as a second luminance value of the first region, wherein the first average value is an average value of first luminance values of all first pixels in the first region, wherein the first region is any one of the at least two regions.

8. The method according to claim 1, wherein obtaining the second luminance value of each region based on the first luminance values of all the first pixels comprised in each region comprises:
  compensating, by the terminal, a first average value based on a location of a first region to obtain a second luminance value of the first region, wherein the first average value is an average value of first luminance values of all first pixels in the first region, wherein the first region is any one of the at least two regions.

9. The method according to claim 8, wherein
  if the first region is closer to a central location of the camera, less compensation is provided for the weighted average value or the first average value; or
  if the first region is farther away from the central location of the camera, more compensation is provided for a weighted average value or the first average value.

10. A terminal, comprising a processor, a memory, and a touchscreen, wherein the memory and the touchscreen are coupled to the processor, the memory is configured to store computer program code, the computer program code comprises a computer instruction, and when the processor reads the computer instruction from the memory, the terminal performs the method according to claim 1.

11. A computer storage medium, comprising a computer instruction, wherein when the computer instruction is executed on a terminal, the terminal is enabled to perform the method according to claim 1.

12. A computer program product, wherein when the computer program product is run on a computer, the computer is enabled to perform the method according to claim 1.

13. A terminal, comprising:
  a camera having at least two regions, and each region comprises at least one first pixel, wherein the camera is configured to obtain a first luminance value of each first pixel, wherein each first pixel corresponds to one first luminance value;
  a display; and
  a processor configured to
  obtain a second luminance value of each region based on first luminance values of all first pixels comprised in each region, wherein each region corresponds to one second luminance value;
  obtain a luminance value of current ambient light based on all the second luminance values, the luminance value is stored in a register; and
  adjust luminance of the display based on the luminance value of the ambient light.

14. The terminal according to claim 13, wherein all first pixels in a first region comprise K1 red light pixels, K2 green light pixels, and K3 blue light pixels, and the first region is any one of the at least two regions; and
  wherein obtaining the second luminance value of each region based on the first luminance values of all the first pixels comprised in each region comprises:
  obtaining a third luminance value of red light based on K1 first luminance values of the K1 red light pixels comprised in the first region, wherein the K1 red light pixels correspond to one third luminance value of the red light;
  obtaining a third luminance value of green light based on first luminance values of the K2 green light pixels comprised in the first region, wherein the K2 green light pixels correspond to one third luminance value of the green light;
  obtaining a third luminance value of blue light based on first luminance values of the K3 blue light pixels comprised in the first region, wherein the K3 blue light pixels correspond to one third luminance value of the blue light; and
  determining a second luminance value of the first region based on the third luminance value of the red light, the third luminance value of the green light, and the third luminance value of the blue light.

15. The terminal according to claim 14, wherein
  when obtaining the third luminance value of the red light based on the K1 first luminance values of the K1 red light pixels comprised in the first region, the processor is configured to determine that an average value of the K1 first luminance values or a maximum value in the K1 first luminance values is the third luminance value of the red light;
  when obtaining the third luminance value of the green light based on the first luminance values of the K2 green light pixels comprised in the first region, the processor is configured to determine that an average value of K2 first luminance values or a maximum value in the K2 first luminance values is the third luminance value of the green light; and when obtaining the third luminance value of the blue light based on the first luminance values of the K3 blue light pixels comprised in the first region, the processor is configured to determine that an average value of K3 first luminance values or a maximum value in the K3 first luminance values is the third luminance value of the blue light.

16. The terminal according to claim 14, wherein when determining the second luminance value of the first region based on the third luminance value of the red light, the third luminance value of the green light, and the third luminance value of the blue light, the processor is configured to: obtain a weighted average value of the third luminance value of the red light, the third luminance value of the green light, and the third luminance value of the blue light; and use the weighted average value as the second luminance value of the first region.

17. The terminal according to claim 14, wherein when determining the second luminance value of the first region based on the third luminance value of the red light, the third luminance value of the green light, and the third luminance value of the blue light,
the processor is configured to: obtain a weighted average value of the third luminance value of the red light, the third luminance value of the green light, and the third luminance value of the blue light; and compensate the weighted average value based on a location of the first region to obtain the second luminance value of the first region.

18. The terminal according to claim 13, wherein in a process in which the processor obtains the second luminance value of each region based on the first luminance values of all the first pixels comprised in each region, the processor performs the following operation on each region:
   using a first average value as a second luminance value of the first region, wherein the first average value is an average value of first luminance values of all first pixels in the first region, wherein
   the first region is any one of the at least two regions.

19. The terminal according to claim 13, wherein obtaining the second luminance value of each region based on the first luminance values of all the first pixels comprised in each region comprises:
   compensating a first average value based on a location of a first region to obtain a second luminance value of the first region, wherein the first average value is an average value of first luminance values of all first pixels in the first region, wherein
   the first region is any one of the at least two regions.

20. The terminal according to claim 19, wherein
if the first region is closer to a central location of the camera, less compensation is provided for a weighted average value or the first average value; or
if the first region is farther away from the central location of the camera, more compensation is provided for the weighted average value or the first average value.

* * * * *

UNITED STATES PATENT AND TRADEMARK OFFICE
CERTIFICATE OF CORRECTION

Page 1 of 1

PATENT NO. : 11,250,813 B2
APPLICATION NO. : 17/043201
DATED : February 15, 2022
INVENTOR(S) : Juyou Wang and Chenlong Li It is certified that error appears in the above-identified patent and that said Letters Patent is hereby corrected as shown below:

In the Claims

Claim 9, Column 23, Line 58, "for the weighted" should be --for a weighted--.

Claim 9, Column 23, Line 61-62, "for a weighted" should be --for the weighted--.

Signed and Sealed this
Nineteenth Day of April, 2022

Katherine Kelly Vidal
*Director of the United States Patent and Trademark Office*